US008640059B2

(12) United States Patent
Sahouria et al.

(10) Patent No.: US 8,640,059 B2
(45) Date of Patent: Jan. 28, 2014

(54) FORMING SEPARATION DIRECTIVES USING A PRINTING FEASIBILITY ANALYSIS

(75) Inventors: Emile Y. Sahouria, Sunnyvale, CA (US); Alexander V. Tritchkov, Hillsboro, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 666 days.

(21) Appl. No.: 12/183,046

(22) Filed: Jul. 30, 2008

(65) Prior Publication Data

US 2009/0125855 A1 May 14, 2009

Related U.S. Application Data

(60) Provisional application No. 60/952,821, filed on Jul. 30, 2007.

(51) Int. Cl.
G06F 17/50 (2006.01)
(52) U.S. Cl.
USPC .............................................. 716/52; 716/112
(58) Field of Classification Search
USPC .................. 716/51, 52, 56, 106, 111, 112
See application file for complete search history.

(56) References Cited

U.S. PATENT DOCUMENTS 7,945,870 B2 * 5/2011 Kahng et al. .................... 716/52
2008/0294281 A1 * 11/2008 Shimshi et al. ............... 700/110

OTHER PUBLICATIONS

'A Rigorous Method to Determine Printability of a Target Layout' by Yenikaya et al., Proc. of SPIE, vol. 6521 (2007).

* cited by examiner

*Primary Examiner* — Vuthe Siek
(74) *Attorney, Agent, or Firm* — Mentor Graphics Corporation

(57) ABSTRACT

Separation directives for integrated circuit layout design data are formed based upon one or more printing feasibility analyses performed on the layout design data. At least one printing feasibility analysis is performed on layout design data to identify portions of the design that may not be correctly formed or "printed" during a photolithographic process. The geometric element edges involved in a potential printing defect are then identified as edges to be formed using separate masks. Further, separation directives may be created to specifically designate the identified edges as edges to be formed using separate masks in a photolithographic manufacturing process.

27 Claims, 8 Drawing Sheets

FORMING SEPARATION DIRECTIVES USING A PRINTING FEASIBILITY ANALYSIS

RELATED APPLICATIONS

This application claims priority under 35 U.S.C. §119(e) to U.S. Provisional Patent Application No. 60/952,821, entitled "Forming Double Patterning Separation Directives With Printing Feasibility," filed on Jul. 30, 2007, and naming Emile Sahouria as inventor, which application is incorporated entirely herein by reference.

FIELD OF THE INVENTION

The present invention is directed to the use of a printing feasibility analysis to decompose the geometric elements in a layout design. Various aspects of the invention may be particularly beneficial for forming one or more separation directives based upon the results of a printing feasibility analysis. The separation directives then can be used to partition the geometric elements in a layer of a layout design data into separate groups, which in turn can be used to create complementary masks for a double-patterning manufacturing process.

BACKGROUND OF THE INVENTION

Electronic circuits, such as integrated microcircuits, are used in a variety of products, from automobiles to microwaves to personal computers. Designing and fabricating microcircuit devices typically involve many steps, known as a "design flow." The particular steps of a design flow often are dependent upon the type of microcircuit, its complexity, the design team, and the microcircuit fabricator or foundry that will manufacture the microcircuit. Typically, software and hardware "tools" verify the design at various stages of the design flow by running software simulators and/or hardware emulators, and errors in the design are corrected or the design is otherwise improved.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. Preliminary timing estimates for portions of the circuit may be made at this stage, using an assumed characteristic speed for each device. In addition, the relationships between the electronic devices are analyzed, to confirm that the circuit described by the device design will correctly perform the desired functions. This analysis is sometimes referred to as "formal verification."

Once the relationships between circuit devices have been established, the design is again transformed, this time into a physical design that describes specific geometric elements. This type of design often is referred to as a "layout" design. The geometric elements, which typically are polygons, define the shapes that will be created in various materials to manufacture the circuit. Typically, a designer will select groups of geometric elements representing circuit device components (e.g., contacts, gates, etc.) and place them in a design area. These groups of geometric elements may be custom designed, selected from a library of previously-created designs, or some combination of both. Lines are then routed between the geometric elements, which will form the wiring used to interconnect the electronic devices. Layout tools (often referred to as "place and route" tools), such as Mentor Graphics' IC Station or Cadence's Virtuoso, are commonly used for both of these tasks.

With a layout design, each physical layer of the circuit will have a corresponding layer representation in the design, and the geometric elements described in a layer representation will define the relative locations of the circuit device components that will make up a circuit device. Thus, the geometric elements in the representation of an implant layer will define the regions where doping will occur, while the geometric elements in the representation of a metal layer will define the locations in a metal layer where conductive wires will be formed to connect the circuit devices. Typically, a designer will perform a number of analyses on the layout design. For example, the layout design may be analyzed to confirm that it accurately represents the circuit devices and their relationships as described in the device design. The layout design also may be analyzed to confirm that it complies with various design requirements, such as minimum spacings between geometric elements.

Still further, the layout design may be modified to implement one or more resolution enhancement techniques (RET). These implementation processes will modify the layout design data, to improve the usable resolution of the reticle or mask created from the design in a photolithographic manufacturing process. One such family of resolution enhancement technique (RET) implementation processes is sometimes referred to as optical proximity correction or optical process correction (OPC) processes. An OPC process may add features such as serifs or indentations to existing geometric elements in the layout design data, to compensate for diffractive effects that will occur during a lithographic manufacturing process. For example, an optical proximity correction process may modify a polygon in a layout design to include a "hammerhead" shape, in order to decrease rounding of the photolithographic image at the corners of the polygon.

After the layout design has been finalized, it is converted into a format that can be employed by a mask or reticle writing tool to create a mask or reticle for use in a photolithographic manufacturing process. Masks and reticles typically are made using tools that expose a blank reticle or mask substrate to an electron or laser beam (or to an array of electron beams or laser beams). Most mask writing tools are able to only "write" certain kinds of polygons, however, such as right triangles, rectangles or other trapezoids. Moreover, the sizes of the polygons are limited physically by the maximum beam (or beam array) size available to the tool. Accordingly, larger geometric elements in the layout design, or geometric elements that are not right triangles, rectangles or trapezoids (which typically are a majority of the geometric elements in a layout design) must be "fractured" into the smaller, more basic polygons that can be written by the mask or reticle writing tool. This process sometimes is referred to as "mask data preparation."

Once a layout design has been fractured into shots, then the fractured layout design data can be converted to a format compatible with the mask or reticle writing tool. Examples of such formats are MEBES, for raster scanning machines manufactured by ETEC, an Applied Materials Company, and various vector scan formats for Nuflare, JEOL, and Hitachi machines, such as VSB11 or VSB12. The written masks or reticles then can be used in a photolithographic process to expose selected areas of a wafer to light or other radiation in order to produce the desired integrated circuit devices on the wafer.

To meet the demand for more powerful microcircuits, designers have regularly increased the average density of devices in a conventional microcircuit. For example, the area that might once have contained 100 transistors may now be required to contain 1,000 or even 100,000 transistors. Some current microcircuit designs call for microcircuit devices to be packed so closely that it may be difficult to properly manufacture adjacent device components in a single lithographic process. For example, a current microcircuit design may specify a series of parallel conductive lines positioned so closely that a conventional mask writer cannot resolve the pitch between the lines.

To address this issue, the structures in a layer of a microcircuit device are now sometimes formed using two or more separate lithographic processes. This technique, referred to as "double patterning," partitions a layout design into two or more groups of geometric elements, each of which then is used to form a complementary lithographic mask pattern. Thus, if a layout design calls for as single geometric element having a series of closely-spaced parallel connective lines, this geometric element may be partitioned into multiple geometric elements so that adjacent lines are actually formed by different masks in separate lithographic processes. A "separation directive" may be employed to identify the geometric element edges that should be imaged by different masks. A separation directive may be, for example, a polygon (such as a rectangle) abutting both of the adjacent edges that will be formed by separate masks.

With some designs, like a series of closely-spaced parallel connective lines, it may be relatively easy to determine which edges should be formed by different masks. With other, more complex designs, however, it is often more difficult to determine which edges should be formed by different masks. For example, some designs may have geometric elements with substantial edges in two orthogonal directions (e.g., multiple geometrical elements with intermixed vertical and horizontal lines). With these more complex designs, it may be difficult to determine which pairs of edges should be formed using different masks.

To address this complexity, some separation techniques use specified rules to determine which edges in a layout design should be separately formed. For example, a rule-based separation technique may insert a separation directive between any two adjacent edges that are within a minimum distance of each other. Rule-based separation techniques are difficult to implement, however, because the rules must be developed on a case-by-case basis. This typically requires creating and manufacturing multiple circuit designs, identifying defects in the manufactured circuits, and then defining rules corresponding to the identified defects. Moreover, rule-based separation techniques can be prone to over-separate a circuit design (i.e., by separating edges that could, in fact, be formed using the same mask in a photolithographic process).

BRIEF SUMMARY OF THE INVENTION

Aspects of the invention relate to techniques for determining which edges in a circuit layout design should be formed using separate masks. According to various implementations of the invention, at least one printing feasibility analysis is performed on layout design data to identify portions of the design that may not be correctly formed or "printed" during a photolithographic process. These implementations of the invention will then designate the geometric element edges involved in the potential printing defect as edges to be formed using separate masks.

For example, some implementations of the invention may perform a printing feasibility analysis on layout design data to identify potential bridging defects in the layout design. As known in the art, a bridging defect occurs when two distinct edges specified in a design are improperly formed during the manufacturing process in a way that causes the edges to merge together and thus "bridge" two different circuit structure components. If a potential bridging defect is identified, then these implementations may create a separation directive designating that the edges that would be involved in the bridging defect be manufactured using separate masks. By using two separate masks to form the edges, the potential bridging defect can be avoided.

DETAILED DESCRIPTION OF THE INVENTION

Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

Figure 1:
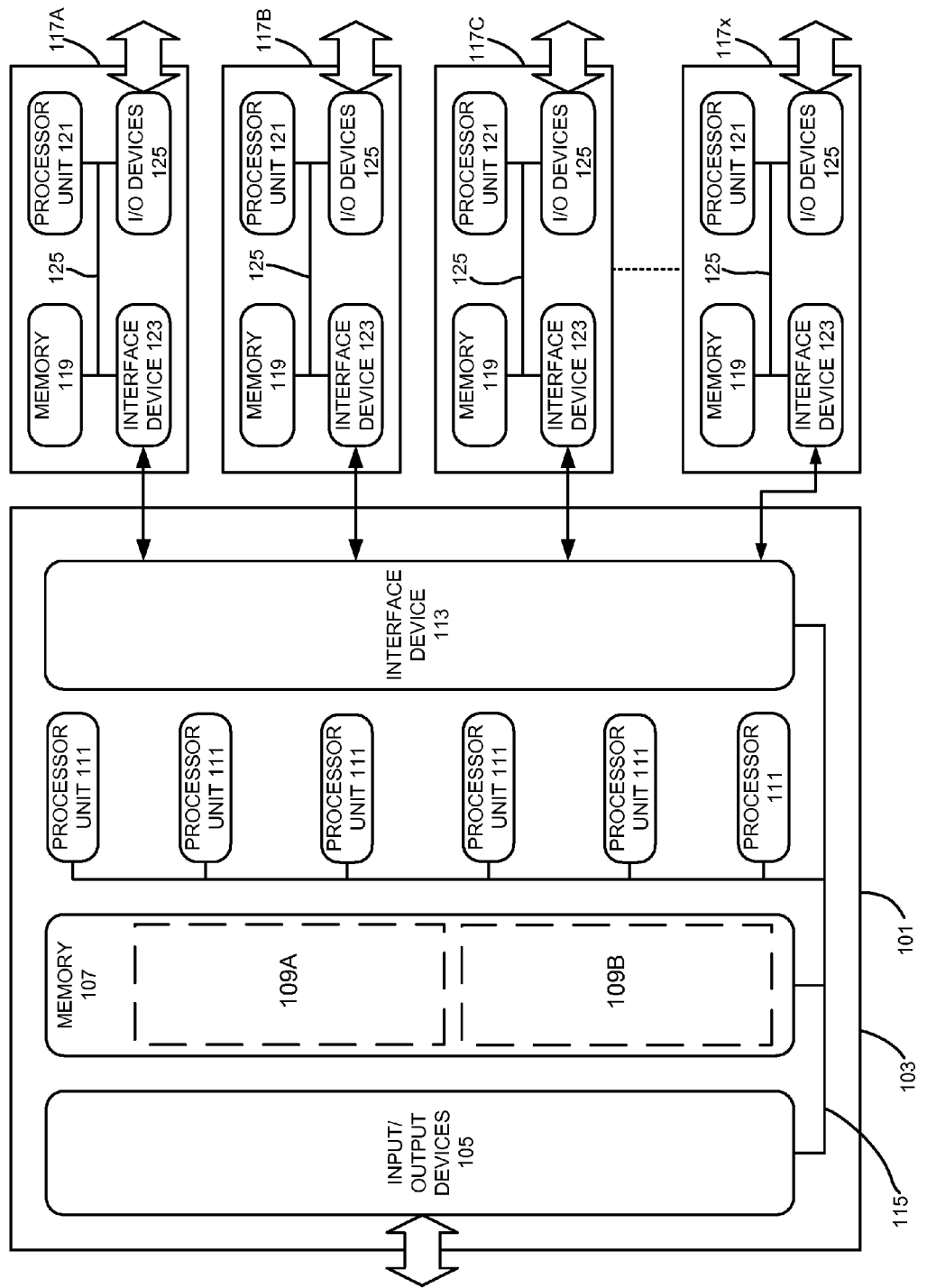
FIG. 1 illustrates a computing system that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
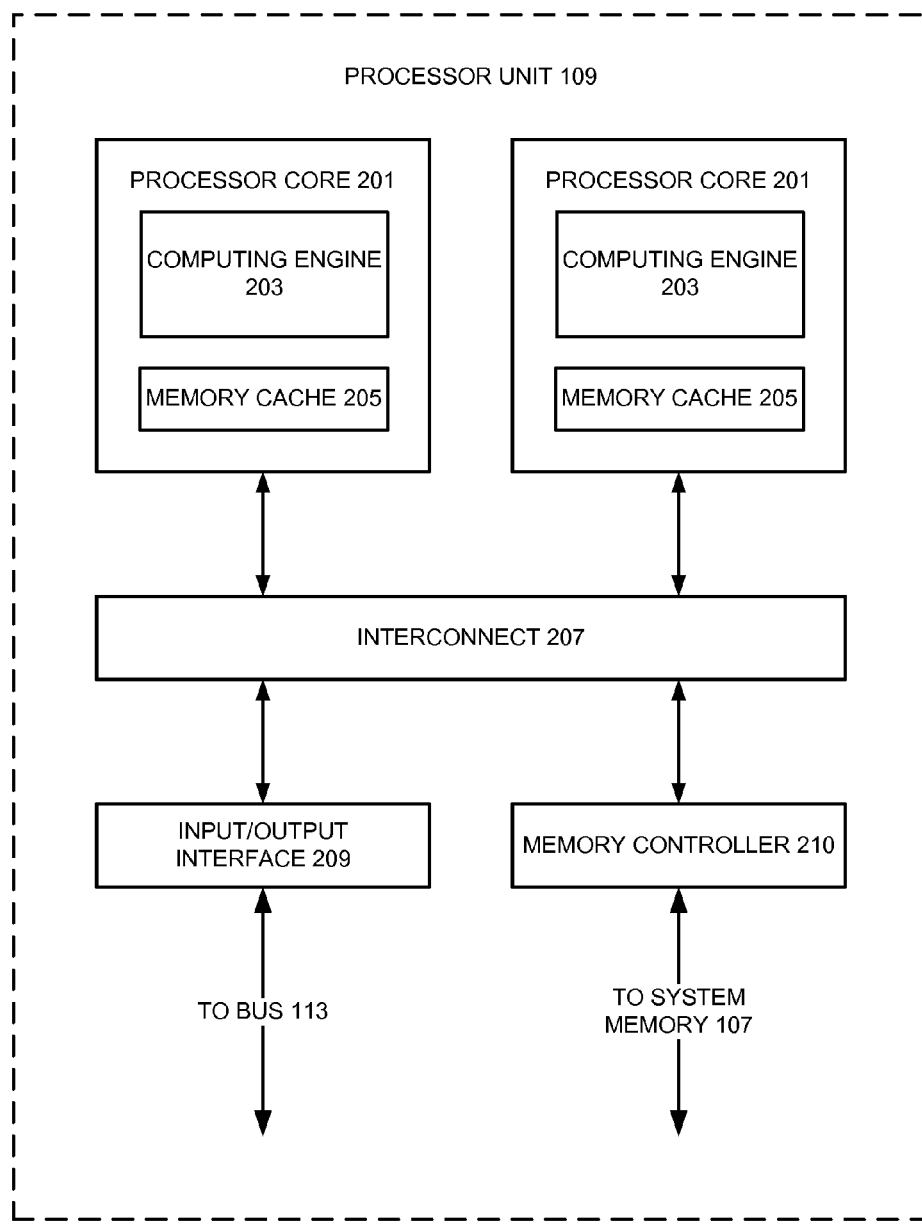
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117*x* through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Geometric Element Edge Separation Tool

Figure 3:
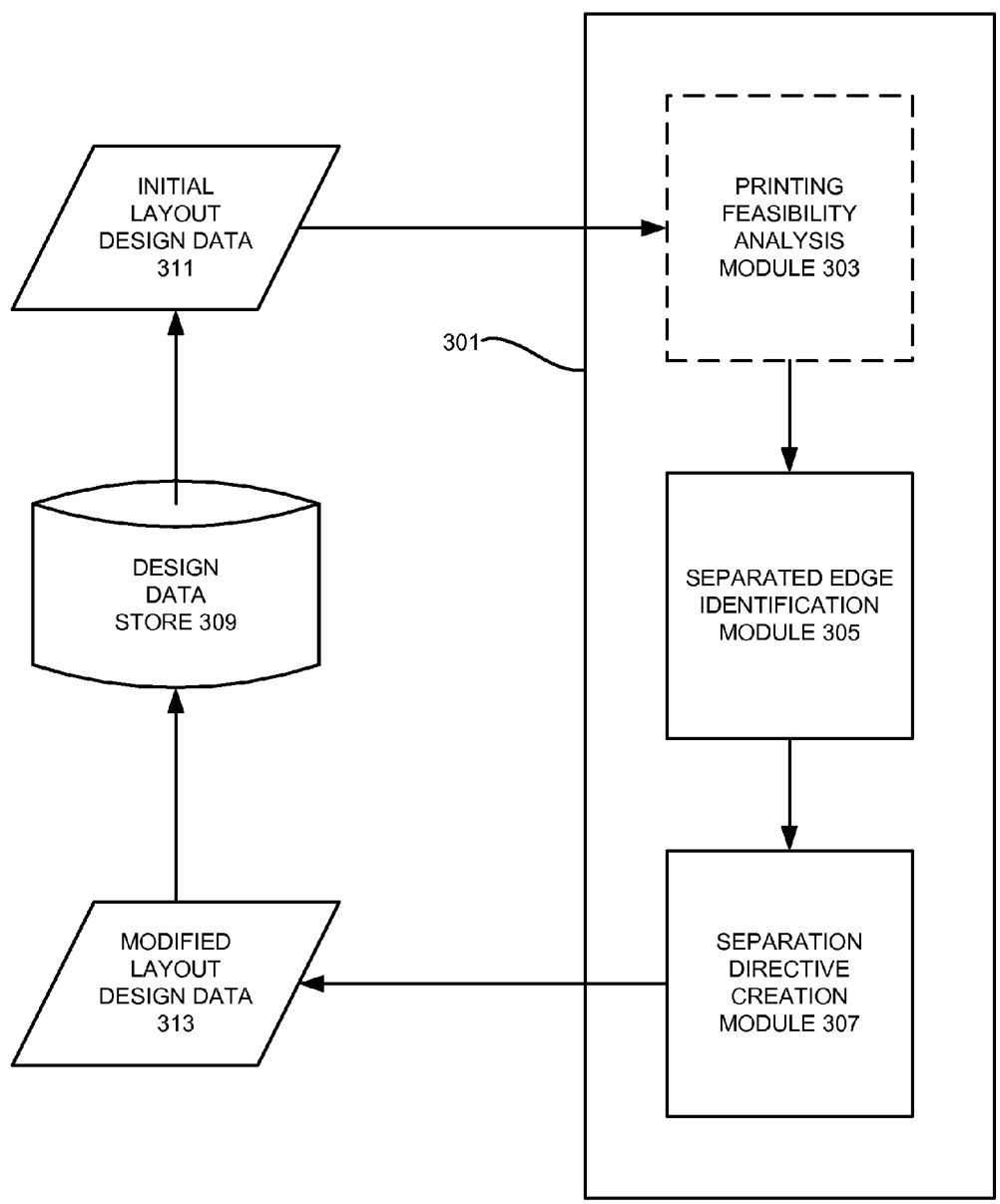
FIG. 3 illustrates an example of a geometric element edge separation tool that may be implemented according to various examples of the invention.

FIG. 3 illustrates an example of a geometric element edge separation tool 301 that may be implemented according to various examples of the invention. As seen in this figure, the geometric element edge separation tool 301 includes an optional printing feasibility analysis module 303, a separated edge identification module 305, and a separation directive creation module 307. As previously noted, various examples of the invention may be implemented by a multiprocessor computing system, such as the multiprocessor computing system 101 illustrated in FIG. 1. Accordingly, one or more components of each of the printing feasibility analysis module 303, the separated edge identification module 305, and the separation directive creation module 307 may be implemented using one or more processors in a multiprocessor computing system's master computer, such as the master computer 103, one or more servant computers in a multiprocessor computing system, such as the servant computers 117, or some combination of both. It also should be appreciated that, while the printing feasibility analysis module 303, the separated edge identification module 305, and the separation directive creation module 307 are shown as separate units in FIG. 3, a single servant computer (or a single processor within a master computer) may be used to implement two or more of these modules at different times.

The geometric element edge separation tool 301 may work with a design data store 309. The design data store 309 may be any data storage device that is capable of storing layout design data and accessible to the separation directive creation tool 301. For example, the design data store 309 may be a magnetic disk drive, a rewritable optical disk drive, a "punch" type memory device, a holographic memory device, etc. Of course, while a single design data store 309 device is illustrated in FIG. 3, alternate examples of the invention may employ two or more separate memory storage devices working in concert to form the design data store 309. With various examples of the invention, the design data store 309 may store layout design data as part of a database for storing design data for use in one or more other electronic design automation processes. For example, the design data store 309 may store the layout design data as part of a hierarchical database used in conjunction with one or more physical verification or resolution enhancement technique tools, such as the family of CALIBRE software design tools available from Mentor Graphics Corporation of Wilsonville, Oregon. It should be noted that, with various examples of the invention, the geometric element edge separation tool 301 may be implemented as part of another electronic design automation tool, such as a resolution enhancement technique tool, a layout design rule check tool, a layout design-for-manufacturability tool, etc.

As will be discussed in more detail below, the geometric element edge separation tool 301 obtains initial layout design data 311. As shown in FIG. 3, the layout design data decomposition tool 301 may obtain the initial layout design data 311 from the design data store 309. With various examples of the invention, the geometric element edge separation tool 301 may receive the initial layout design data 311 from the design data store 309 either by actively retrieving the initial layout design data 311, or by being provided the initial layout design data 311 by a separate entity, such as a user, an operating system, a separate executable software program, or some combination thereof. Of course, with various examples of the invention, the initial layout design data 311 may also be obtained from a different source than the design data store 309. For example, the initial layout design data 311 may be provided to the geometric element edge separation tool 301 by a separate entity, such as a user, an operating system, a separate executable software program, or some combination thereof. Still further, the initial layout design data 311 may be obtained from a variety of sources, which may or may not include the design data store 309.

The geometric element edge separation tool 301 identifies edges in the initial layout design data 311 that should be formed using separate masks, in order to produce the modified layout data 317. As will be described in more detail below, the printing feasibility analysis module 303 performs a printing feasibility analysis on the initial layout design data 311, in order to identify potential printing defects. Based upon these identified potential printing defects, the separated edge identification module 305 will identify edges that should be formed by separate masks. The separation directive creation module 307 will then create separation directives specifying that the identified edges should be formed by separate masks. With the illustrated embodiment of the geometric element edge separation tool 301, the separation directive creation module 307 will then add the created separation directives to the initial layout design data 311, producing the modified layout design data 313. With still other embodiments of the invention, however, the separation directive creation module 307 may store the separation directives separately from the initial layout design data 311, either in a separate location of the design data store 309 or on a different electronic data storage medium.

Separation of Geometric Element Edges

Figure 4:
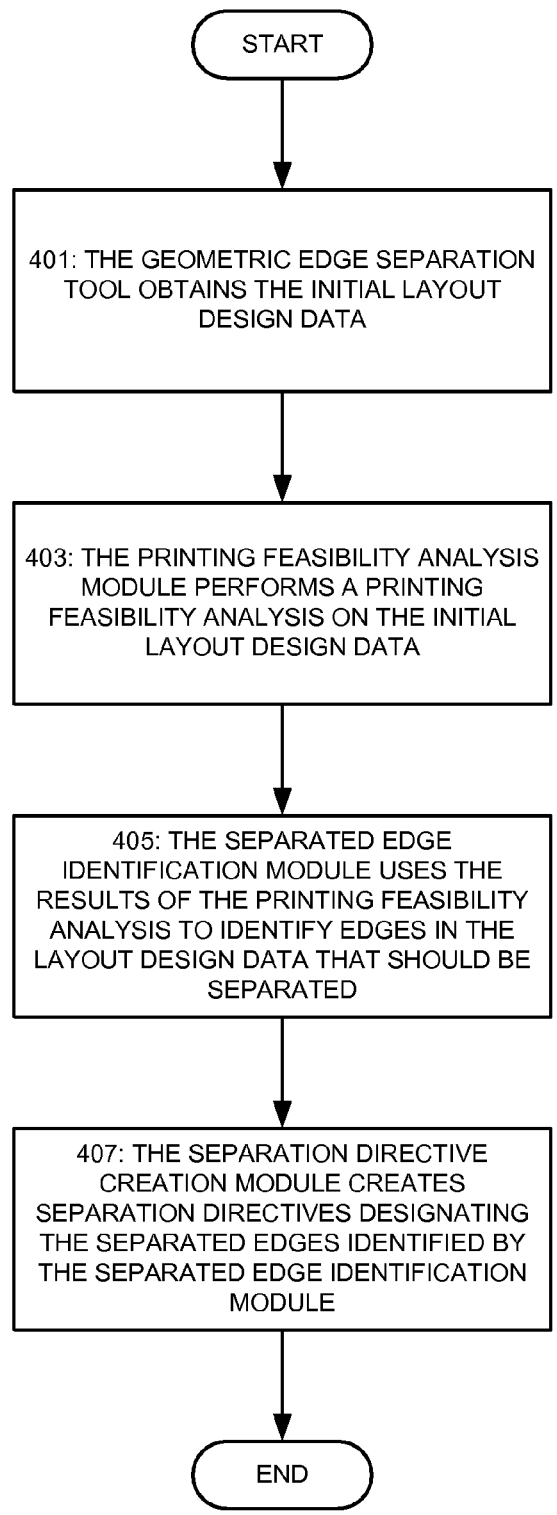
FIG. 4 illustrates a flowchart showing a method of separating geometric edges in a layout design using the geometric element edge separation tool 301 illustrated in FIG. 3.

FIG. 4 illustrates a flowchart showing a method of separating the edges of geometric elements in a layout design using the geometric element edge separation tool 301 illustrated in FIG. 3. In step 401, the geometric element edge separation tool 301 obtains the initial layout design data 311. As used herein, the term "design" is intended to encompass data describing an entire microdevice, such as an integrated circuit device or a micro-electromechanical system (MEMS) device. This term also is intended to encompass a smaller group of data describing one or more components of an entire microdevice, however, such as a layer of an integrated circuit device, or even a portion of a layer of an integrated circuit device. Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

As will be appreciated by those of ordinary skill in the art, layout design data will include one or more geometric elements to be written to a mask or reticle. For conventional mask or reticle writing tools, the geometric elements typically will be polygons of various shapes. Thus, the layout design data will usually include polygon data describing the features of polygons in the design. With various examples of the invention, the layout design data may include unfractured polygon data, previously-fractured polygon data, or some combination thereof. For example, the initial layout design data 311 may include geometric elements such as the polygons 501 and 503 shown in FIG. 5.

As also will be appreciated by those of ordinary skill in the art, however, double patterning is a technique for using two or more complementary lithographic masks to form structures in a single layer of material (for example, a single conductive layer of material). It therefore should be understood that the geometric element edge separation tool 301 typically separates edges defining structures to be formed in a single layer of material. Accordingly, the initial layout design data 311 typically will describe structures to be formed in a single layer of material, or will be data that can be differentiated into sets of data that each describes structures to be formed in a single layer of material.

In addition, the initial layout design data 311 may include information used to interpret the data describing the structures, or to specify special treatment for some subset of the structure data. For instance, it may be undesirable to generate a cut path in a polygon representing a transistor gate. Accordingly, some type of prohibition information may be included with that polygon to indicate to the tool 301 should not separate any of the edges defining the same transistor gate.

Next, in step 403, the printing feasibility analysis module 303 performs a printing feasibility analysis on the initial layout design data 311. As will be appreciated by those of ordinary skill in the art, a printing feasibility analysis is an analysis performed on layout design data to predict or otherwise determine how accurately the layout data will be reproduced when the structures defined by the data are manufactured during a lithographic process. For example, a printing feasibility analysis may predict how much each edge in a design will vary from ideal during a photolithographic manufacturing process due to, e.g., diffractive effects. A printing feasibility analysis also may take into account other effects that arise during a photolithographic manufacturing process, such as etching effects, polishing effects, photoresist stability, etc.

In the course of performing the printing feasibility analysis, the printing feasibility analysis module 303 will identify various defects that could potentially occur when the design data is used to manufacture a circuit during a photolithographic manufacturing process. For example, the printing feasibility analysis module 303 may identify edges on different geometric elements that will be susceptible to merging together during a photolithographic manufacturing process, so as to bridge the geometric elements. This type of potential defect is often referred to as a potential bridging defect. Alternately or additionally, the printing feasibility analysis module 303 may identify edges of the same geometric element that will be susceptible to merging together during a photolithographic manufacturing process, so as to "pinch" the structure defined by the geometric element along its length. This type of potential defect is often referred to as a potential pinching defect. It should be noted that a pinching defect may completely sever the structure into two separate parts, or just narrow a portion of the structure below an acceptable width.

Figure 5:
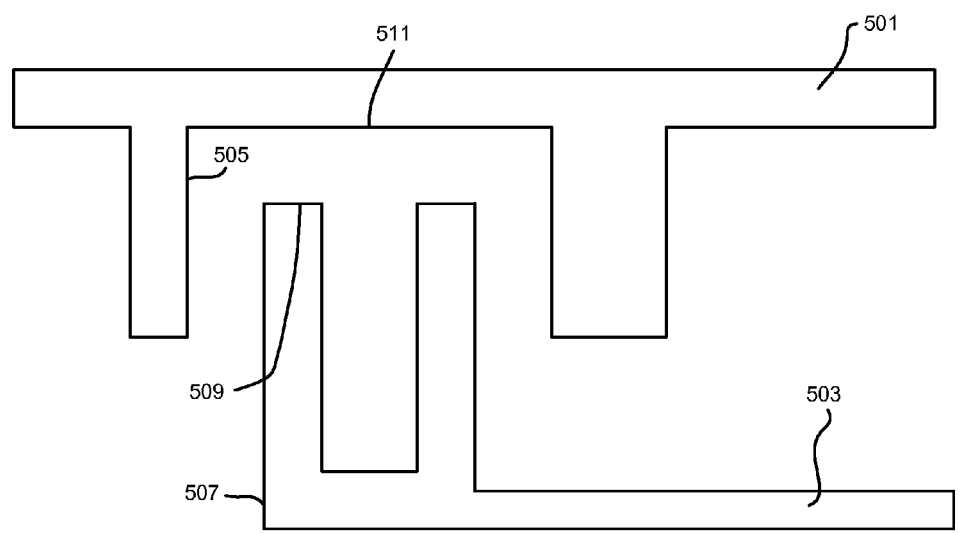
FIG. 5 illustrates an example of geometric elements, i.e., polygons, in layout design data.
Figure 6:
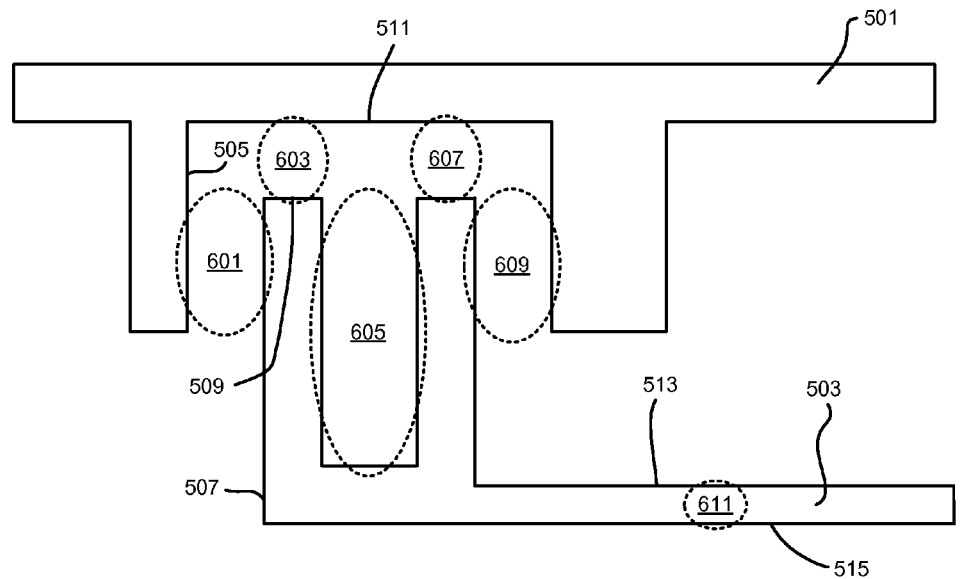
FIG. 6 illustrates potential defects that may be identified in the layout design data shown in FIG. 5 according to various embodiments of the invention.

FIG. 6 illustrates an example of potential defects 601-611 that various implementations of the printing feasibility analysis module 303 may identify after performing a printing feasibility analysis on the layout design data illustrated in FIG. 5. As seen in this figure, for example, the printing feasibility analysis module 303 may identify a potential bridging defect 601 where the structure perimeter corresponding to edge 505 of the design may erroneously contact the structure perimeter corresponding to the edge 507 during a photolithographic manufacturing process. Similarly, the printing feasibility analysis module 303 may identify a potential bridging defect 603 where the structure perimeter corresponding to edge 509 of the design may erroneously contact the structure perimeter corresponding to the edge 511 during a photolithographic manufacturing process. Still further, the printing feasibility analysis module 303 may identify a potential pinching defect 611 where the structure perimeter corresponding to edges 513 and 515 of the design may erroneously move closer to each other or contact during a photolithographic manufacturing process.

It should be appreciated that various implementations of the invention can employ a variety of printing feasibility analysis techniques that are well-known in the art. One such printing feasibility analysis technique is discussed in detail in the article "A Rigorous Method To Determine Printability Of A Target Layout" by Bayram Yenikaya et al., Proc. of SPEI, Vol. 6521 (2007), which article is incorporated herein by reference in its entirety. Of course, still other printing feasibility analysis techniques are well known to those of ordinary skill in the art, and may be employed according to various embodiments of the invention. It also should be appreciated that, with some implementations of the invention, the printing feasibility analysis module 303 is optional, and may be omitted from the separation directive creation tool 301 altogether. With these implementations of the invention, the printing feasibility analysis may be performed separately from the operation of the separation directive creation tool 301, and the results of the printing feasibility analysis provided directly to the separation directive creation tool 301.

Next, in step 405, the separated edge identification module 305 uses the results of the printing feasibility analysis to identify edges in the layout design data that should be separated. As used herein, the term "separated edges" refers to edges of one or more geometric elements that should or must be formed using separate lithographic masks in a photolithographic manufacturing process. For example, with some implementations of the invention, the separated edge identification module 305 may determine that the edge 505 must formed using a separate lithographic mask from the edge 507, based upon the potential bridging defect 601. Similarly, the separated edge identification module 305 may determine that the edge 509 must formed using a separate lithographic mask from the edge 511, based upon the potential bridging defect 603.

With some implementations of the invention, the separated edge identification module 305 may only separate edges associated with potential bridging defects. With these implementations of the invention, the printing feasibility analysis module 303 may omit information providing the separated edge identification module 305 with information regarding other types of potential defects, such as pinching defects. Alternately, the separated edge identification module 305 may simply ignore information provided by the printing feasibility analysis module 303 regarding other types of defects.

In still other implementations of the invention, the separated edge identification module 305 may alternately or additionally separate edges associated with other types of potential defects, such as potential pinching defects. For example, with some implementations of the invention, the separated edge identification module 305 may determine that separated edges should be designated to avoid the potential pinching defect 611. The separated edge identification module 305 may, e.g., create two new, concurrent "virtual edges" orthogonal to the edges 513 and 515 in the region of the potential pinching defect 611. By designating that these virtual edges be separate, the separated edge identification module 305 will effectively create a cut path for when the layout design is subsequently partitioned to form multiple masks.

With some implementations of the invention, the separated edge identification module 305 may separate every edge associated with a specified type of potential defect. In still other implementations, however, the separated edge identification module 305 may only separate edges associated with potential defects that have a threshold likelihood of occurrence during a photolithographic manufacturing process. For example, in addition to identifying a potential defect, the printing feasibility analysis module 303 also may determine the likelihood that a potential defect will occur during a photolithographic manufacturing process. If the printing feasibility analysis module 303 identifies an unacceptably large number of potential defects that would otherwise require separated edges, then the separated edge identification module 305 may only identify those edges for separation that are associated with a potential defect more than, e.g., 80% likely to occur during a photolithographic manufacturing process.

It should be appreciated that, with various examples of the invention, steps 403 and 405 can be repeated multiple times, with a different printing feasibility analysis used for each iteration of the steps. Alternately or additionally, multiple different printing feasibility analysis techniques could be used together in step 403, with the results of the different techniques being provided together to the separated edge identification module 305 for use in one or more subsequent iterations of step 405.

Figure 7:
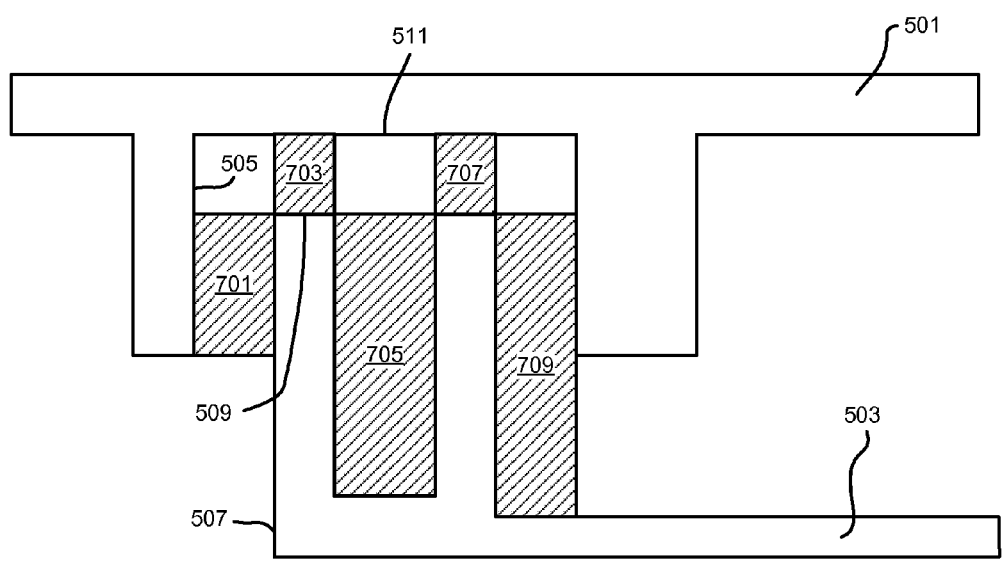
FIG. 7 illustrates separation directive polygons that can be created to designate separated edges in the layout design data illustrated in FIG. 5 according to various embodiments of the invention.

In step 407, the separation directive creation module 307 creates separation directives designating the separated edges identified by the separated edge identification module 305. The separation directives may take any form that can be employed in a subsequent desired partitioning process. For example, some implementations of the invention may employ the CALIBRE family of electronic design automation tools (available from Mentor Graphics Corporation of Wilsonville, Oregon) to create separation directives. This family of electronic design automation tools may, for example, create separation directives as separation directive polygons located between separated edges, such as the directive polygons 701-709 illustrated in FIG. 7. As seen in this figure, the separation directive polygon separation 701 separates edge 505 from edge 507, clearly designating these edges as separated edges. Similarly, the separation directive polygon 703 separates edge 509 from edge 511, designating these edges as separated edges. Of course, any other desired type of separation directive can be used to designate separated edges, such as entries in a lookup table, linking structures, or the like.

With various implementations of the invention, the created separation directives may be added to the initial layout design data 311 (or to a copy of the initial layout design data 311), and the modified layout design data 313 stored back in the design data store 309. With still other implementations of the invention, however, the created separation directives may alternately or additionally be stored separately from the initial layout design data 311.

Partitioning of the Layout Design Data

Once the separation directives have been created designating which edges in the layout design data should be formed using different photolithographic masks, then the layout design data is partitioned to implement the designated edge separations in a decomposition process. With some decomposition processes, for example, cut paths are generated for partitioning the geometric elements in the initial layout design data 311. Any desired technique can be used to generate these cut paths, such as generating cut paths according to a library of cut types.

Figure 8:
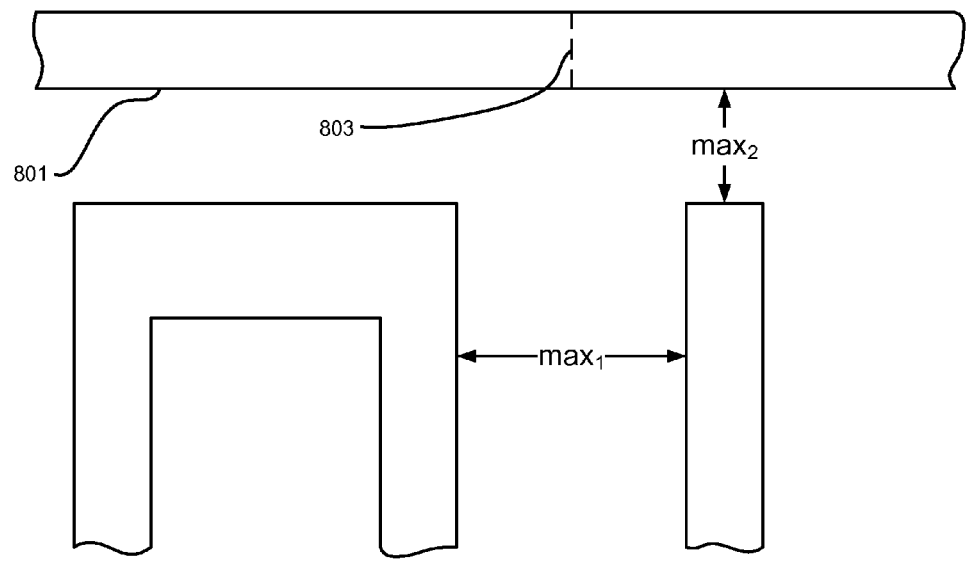
FIG. 8 illustrates an example of a cut type model that can be used to determine cut paths.

FIG. 8 illustrates one example of a cut type that may be employed with various implementations of the invention. This cut type specifies that a polygon 801 have a proposed cut path 803 that should be made at a local "T-shaped" intersection. The a geometric element 801 forms a T-shaped intersection if it consists of exactly two rectangular pieces in the configuration of FIG. 8, where $d_1$, $d_2 \geq eps$, and $d_3 > 2*eps$, and eps is the overlay tolerance for the stepper that will be used to form the structures during a lithographic process (i.e., the maximum distance that the two exposures can be offset from each other). Of course, still other embodiments of the invention may allow a user to specify the parameters for one or more of $d_1$, $d_2$, and $d_3$. Typically, this type of "T-intersection" configuration can be efficiently and unambiguously detected in the layout design data. Of course, still other cut types, such as L-shaped intersections and π-shaped intersections, may alternately or additionally be employed. Also, as previously noted, any other desired technique, such as techniques employing process simulation, may alternately or additionally be used to determine suitable proposed cut paths.

Figure 9:
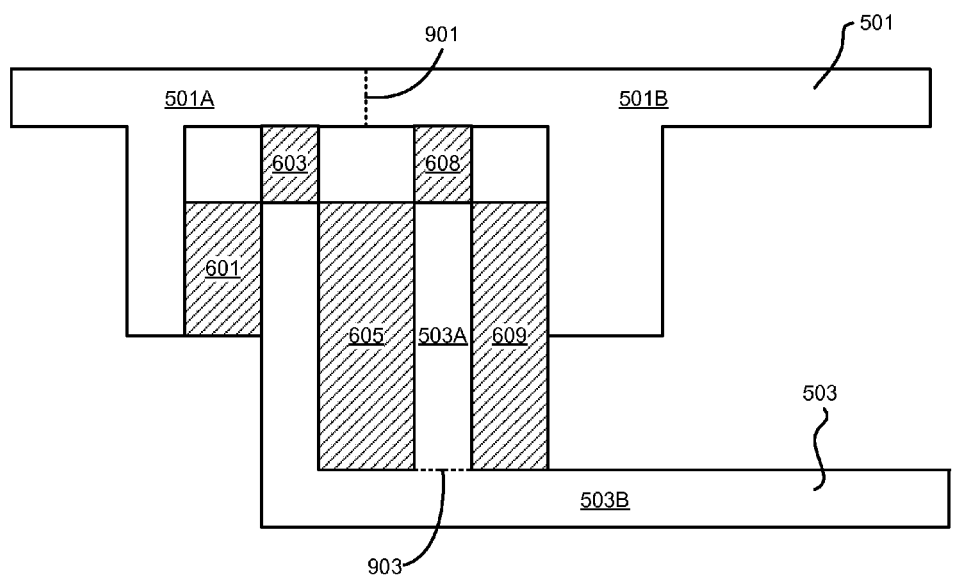
FIG. 9 illustrates cut paths selected to partition the geometric elements shown in FIG. 5 according to the separation directive polygons illustrated in FIG. 7.
Figure 10A:
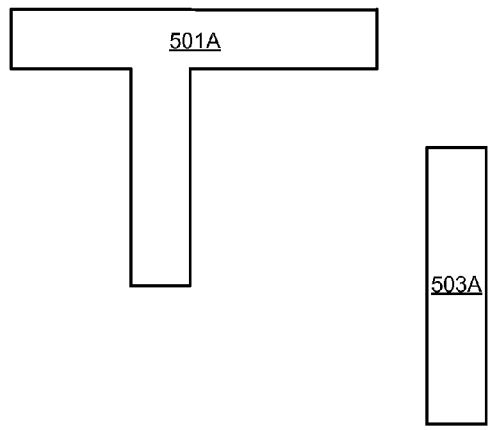
FIGS. 10A and 10B illustrate complementary layout design data segmented using the cut paths illustrated in FIG. 9.
Figure 10B:
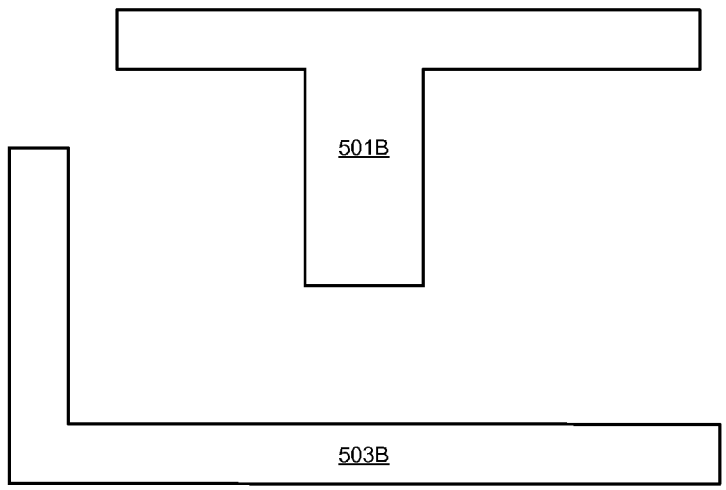

Thus, as shown in FIG. 9, cut paths 901 and 903 are generated during a decomposition process to partition the layout design data. More particularly, the cut path divides the geometric element 501 into polygon segments 501A and 501B, while the cut path 903 divides the geometric element 503 into polygon segments 503A and 503B. Based upon these cut paths 901 and 903, the geometric elements 501 and 503 can partitioned so that the polygon elements 501A and 503A can be formed using one mask, as shown in FIG. 10A, while the polygon elements 501B and 503B can be formed using a different mask, as shown in FIG. 10B. In this manner, separate edges designated by each of the separation directive polygons 601-611 can be formed by separate lithographic masks. It should be appreciated that any desired decomposition technique may be used to partition the layout design data in a manner that complies with the separation directives created by the separation directive creation module 307.

Conclusion

While specification embodiments of the invention have been shown and described in detail above to illustrate the principles of the invention, it will be understood that the invention may be otherwise embodied without departing from the invention. Thus, while the invention has been described with respect to specific examples including presently preferred modes of carrying out the invention, those of ordinary skill in the art will appreciate that there are numerous variations and permutations of the above described systems and techniques that fall within the spirit and scope of the invention as set forth in the appended claims.

What is claimed is:

1. A method of generating separation directives for segmenting circuit layout design data, comprising:
   employing a computer to
      analyze potential manufacturing defects identified in a printing feasibility analysis performed on circuit layout design data, and
      based upon the potential manufacturing defects, identify separated edges in the layout design data that should be formed using separate masks in a lithographic manufacturing process; and
   employing a computer to create separation directives designating the separated edges as edges that should be formed using separate masks in a lithographic manufacturing process.

2. The method recited in claim 1, further comprising modifying the circuit layout design data to include the separation directives.

3. The method recited in claim 1, further comprising performing the printing feasibility analysis on the circuit layout design data to identify the potential manufacturing defects.

4. The method recited in claim 1, wherein the potential manufacturing defects include bridging defects and pinching defects.

5. The method recited in claim 1, further comprising storing the separation directives in an electronic data storage medium.

6. The method recited in claim 1, wherein the separation directives include a separation directive with a polygon abutting the separated edges designated by the separation directive.

7. The method recited in claim 1, wherein the separation directives include a separation directive with one or more virtual edges orthogonal to the separated edges designated by the separation directive.

8. The method recited in claim 1, wherein employing a computer to create the separation directives further includes:
   analyzing the layout design data to determine if any of the separated edges are associated with prohibition information indicating that the separated edges should not be formed using separate masks in a lithographic manufacturing process; and
   creating separation directives designating only the separated edges that are not associated with prohibition information.

9. The method recited in claim 1, further comprising identifying the separated edges based upon potential manufacturing defects having a threshold likelihood of occurring in a lithographic manufacturing process.

10. The method recited in claim 1, further comprising employing a computer to:
   analyze potential manufacturing defects identified in a second printing feasibility analysis performed on the circuit layout design data, and
   based upon the potential manufacturing defects identified in the second printing feasibility analysis, identify separated edges in the layout design data that should be formed using separate masks in a lithographic manufacturing process.

11. The method recited in claim 1, further comprising partitioning the circuit layout design data using the created separation directives.

12. An edge separation tool, comprising:
   a separated edge identification module configured to
      analyze potential manufacturing defects identified in a printing feasibility analysis performed on circuit layout design data, and
      based upon the potential manufacturing defects, identify separated edges in the layout design data that should be formed using separate masks in a lithographic manufacturing process; and a separation directive creation module configured to create separation directives designating the separated edges as edges that should be formed using separate masks in a lithographic manufacturing process.

13. The edge separation tool recited in claim 12, further comprising a printing feasibility analysis module configured to perform the printing feasibility analysis on the circuit layout design data to identify the potential manufacturing defects.

14. The edge separation tool recited in claim 13, wherein the printing feasibility analysis module is configured to identify potential manufacturing defects include bridging defects and pinching defects.

15. The edge separation tool recited in claim 12, wherein the separation directive creation module is further configured to modify the circuit layout design data to include the separation directives.

16. The edge separation tool recited in claim 12, wherein the separation directive creation module is further configured to store the separation directives in an electronic data storage medium.

17. The edge separation tool recited in claim 12, wherein the separation directive creation module is configured to generate a separation directive with a polygon abutting the separated edges designated by the separation directive.

18. The edge separation tool recited in claim 12, wherein the separation directive creation module is configured to generate a separation directive with one or more virtual edges orthogonal to the separated edges designated by the separation directive.

19. The edge separation tool recited in claim 12, wherein the separation directive creation module is configured to create separation directives designating only separated edges that are not associated with prohibition information indicating that the edges should not be formed using separate masks in a lithographic manufacturing process.

20. One or more computer-readable media devices having stored thereon computer executable instructions for causing a computer to perform the method, comprising:
    analyzing potential manufacturing defects identified in a printing feasibility analysis performed on circuit layout design data;
    based upon the potential manufacturing defects, identifying separated edges in the layout design data that should be formed using separate masks in a lithographic manufacturing process; and
    creating separation directives designating the separated edges as edges that should be formed using separate masks in a lithographic manufacturing process.

21. The one or more computer-readable media devices recited in claim 20, wherein the method further comprises performing the printing feasibility analysis on the circuit layout design data to identify the potential manufacturing defects.

22. The one or more computer-readable media devices recited in claim 20, wherein the method further comprises modifying the circuit layout design data to include the separation directives.

23. The one or more computer-readable media devices recited in claim 20, wherein the method further comprises storing the separation directives in an electronic data storage medium.

24. The one or more computer-readable media devices recited in claim 20, wherein the method further comprises creating separation directives that include at least one separation directive with a polygon abutting the separated edges designated by the at least one separation directive.

25. The one or more computer-readable devices media recited in claim 20, wherein the method further comprises creating separation directives that include at least one separation directive with one or more virtual edges orthogonal to the separated edges designated by the at least one separation directive.

26. The one or more computer-readable media devices recited in claim 20, wherein the computer-executable instructions for creating the separation directives includes computer executable instructions for:
    analyzing the layout design data to determine if any of the separated edges are associated with prohibition information indicating that the separated edges should not be formed using separate masks in a lithographic manufacturing process; and
    creating separation directives designating only the separated edges that are not associated with prohibition information.

27. The one or more computer-readable media devices recited in claim 20, wherein the computer-executable instructions for identifying the separated edges include computer executable instructions for identifying the separated edges based upon potential manufacturing defects having a threshold likelihood of occurring in a lithographic manufacturing process.

* * * * *